Feb. 17, 1970 — Z. RADOVIC — 3,495,545
CONVEYOR
Filed Oct. 10, 1967 — 2 Sheets-Sheet 2

INVENTOR
ZELJKO RADOVIC
BY *[signature]*
ATTORNEY

United States Patent Office 3,495,545
Patented Feb. 17, 1970

3,495,545
CONVEYOR
Zeljko Radovic, Aarau, Aargau, Switzerland, assignor to Sybron Corporation, Rochester, N.Y., a corporation of New York
Filed Oct. 10, 1967, Ser. No. 674,220
Claims priority, application Germany, Feb. 22, 1967, E 33,450
Int. Cl. B61b *3/00;* E01b *25/22;* B65g *17/20*
U.S. Cl. 104—89  5 Claims

ABSTRACT OF THE DISCLOSURE

A stabilizing and locking mechanism for overhead mono-rail conveyor systems maintains a container, pivotally suspended from the coveyor, in a vertically oriented position as the conveyor moves from a horizontal to a vertical course of travel. The stabilizing mechanism includes a guide lever which is journaled to the conveyor and connected to the container. The guide lever engages and travels along a guide rail located adjacent the transition and vertical sections of the monorail track to maintain the container in a vertically oriented position as the conveyor makes the transition from horizontal to vertical travel. A locking mechanism maintains the container in a vertically oriented position during the horizontal course of travel and is automatically released to free the container as the guide lever engages the guide rail at the start of the vertical course of travel.

BACKGROUND OF THE INVENTION

Figure 1:
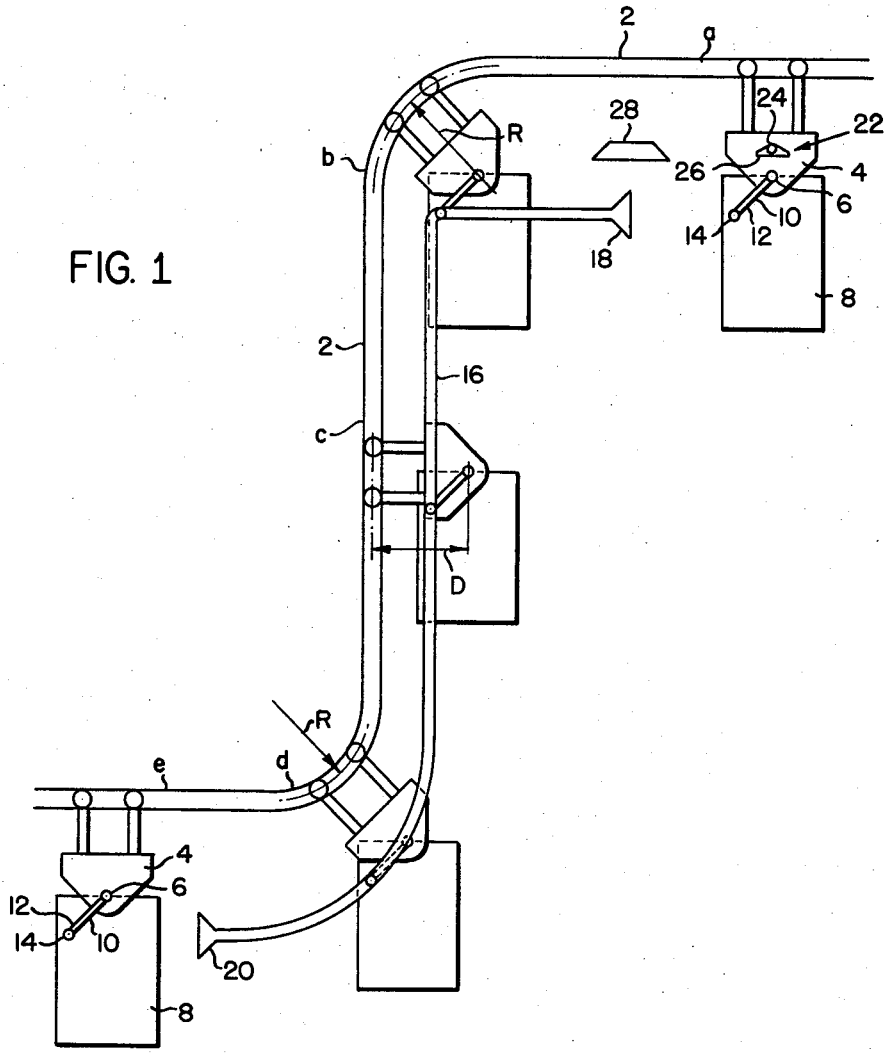

The present invention relates to a monorail transport system which is capable of both vertical and horizontal travel and which has a container suspended from a transporter mounted on the monorail track. More specifically, the present invention relates to a stabilizing and locking device for use in such monorail systems for maintaining the container in a vertically oriented position throughout the course of horizontal and vertical travel regardless of the load distribution in the container.

Monorail transport systems are widely used in factories, offices, stores and hospitals to facilitate the transportation of goods and materials within or between buildings. In such systems it is common practice to mount the monorail track from the ceiling so that the transporter will normally travel in a horizontal direction. However, it is often necessary to have the transporter travel on a vertical section of monorail track. For example, when a load or unload station is approached, the transporter with its attached container must be brought down near floor level to facilitate the loading or unloading of goods. Vertical travel is also necessary when the goods or materials are to be transported from the basement or lower level to an upper floor of the building.

Monorail systems have been developed in which the transporter, mounted on the monorail track, is able to negotiate a vertical section of the track under its own power and without the assistance of counterweights, cables or other auxiliary equipment. In such systems it is common practice to place the goods or materials into a container which is suspended from the transporter so that gravity will maintain the container in a vertical or near vertical orientation as the transporter traverses the horizontal, transition and vertical sections of the monorail track.

However, where the load distribution in the container may be unbalanced, it is necessary to provide some sort of stabilizing and locking mechanism for the container to insure that the container remains in a near vertical orientation regardless of the load distribution. This is especially the case where liquids are transported in open vessels loaded into the containers. Furthermore, where the vertical section of monorail track passes through narrow shaftways, it is necessary to maintain the container in a near vertical orientation so that the container will not sway and strike the walls of the shaftway.

SUMMARY OF THE INVENTION

The present invention utilizes a guide rail and roller arrangement to insure correct orientation of the container during the transitional and vertical courses of travel. The roller is attached to a guide lever, and the guide lever is in turn connected to the container. In one embodiment of the invention the guide lever is mounted directly to the shaft which suspends the container from the transporter. In another embodiment the guide lever is mounted to a shaft on the transporter which is connected by a gear or chain and sprocket drive to the shaft which suspends the container from the transporter. In each of these embodiments the invention is characterized by the fact that the axis of the shaft mounting the guide lever is spaced from the adjacent monorail track section a distance which is not greater than the radius of curvature of any of the transitional monorail track sections.

The embodiments of the present invention illustrate that there is a basic difference between the case where the distance between the axis of the shaft from which the container is suspended and the adjacent monorail track section is greater than the radius of the transitional monorail track section, and the case where this distance is smaller than such radius.

In making the transition from a vertical to a horizontal course of travel the transporter may at times swing through an arc which has as a center, the center of curvature of the transitional monorail track section. In the latter case above, the shaft from which the container is suspended lies within the radius of curvature so that the shaft and therefore the container moves in the same direction as the transporter and through a path of travel which is concentric with the travel of the transporter. In the former case above, the shaft lies beyond the center of curvature of the transitional monorail track section so that the shaft and therefore the container moves through an arc concentric with but in an opposite direction from the path of travel of the transporter. This reversal of direction makes it difficult if not impossible to design and install a suitable guide rail. Thus, in order to insure proper guidance of the container during transitional and vertical courses of travel it is desirable to have the shaft from which the container is suspended located between the center of curvature of the transitional monorail track section and the adjacent monorail track. In cases where such a location is not possible due, for example, to the size of the container, the guide lever must be mounted to an additional shaft journaled to the transporter at a point within the radius of curvature. A suitable drive means, such as a gear or a chain and sprocket, must then be provided between this additional shaft and the shaft from which the container is suspended.

In order to eliminate guide rails along the horizontal course of travel, thereby reducing both the amount of material used and cost of installation, the present invention utilizes a releasable lock that maintains the container in a vertically oriented position during the horizontal course of travel. The lock is released automatically to free the container as the guide lever engages the guide rail.

OBJECTS OF THE INVENTION

An object of the invention is to provide a stabilizing mechanism for monorail transported containers which maintains the container in a vertically oriented position regardless of the load distribution in the container.

Another object of the invention is to provide a stabilizing mechanism for monorail transported containers which maintains the container in a vertically oriented position regardless of the inclination of the monorail track.

A further object of this invention is to provide a stabilizing and locking mechanism for monorail transported containers which prevents the container from swaying as it is transported through both horizontal and vertical courses of travel.

An additional object of the present invention is to provide a stabilizing and locking mechanism for monorail transported containers which operates effectively regardless of the distance between the shaft from which the container is suspended and the adjacent monorail track section.

Figure 2:
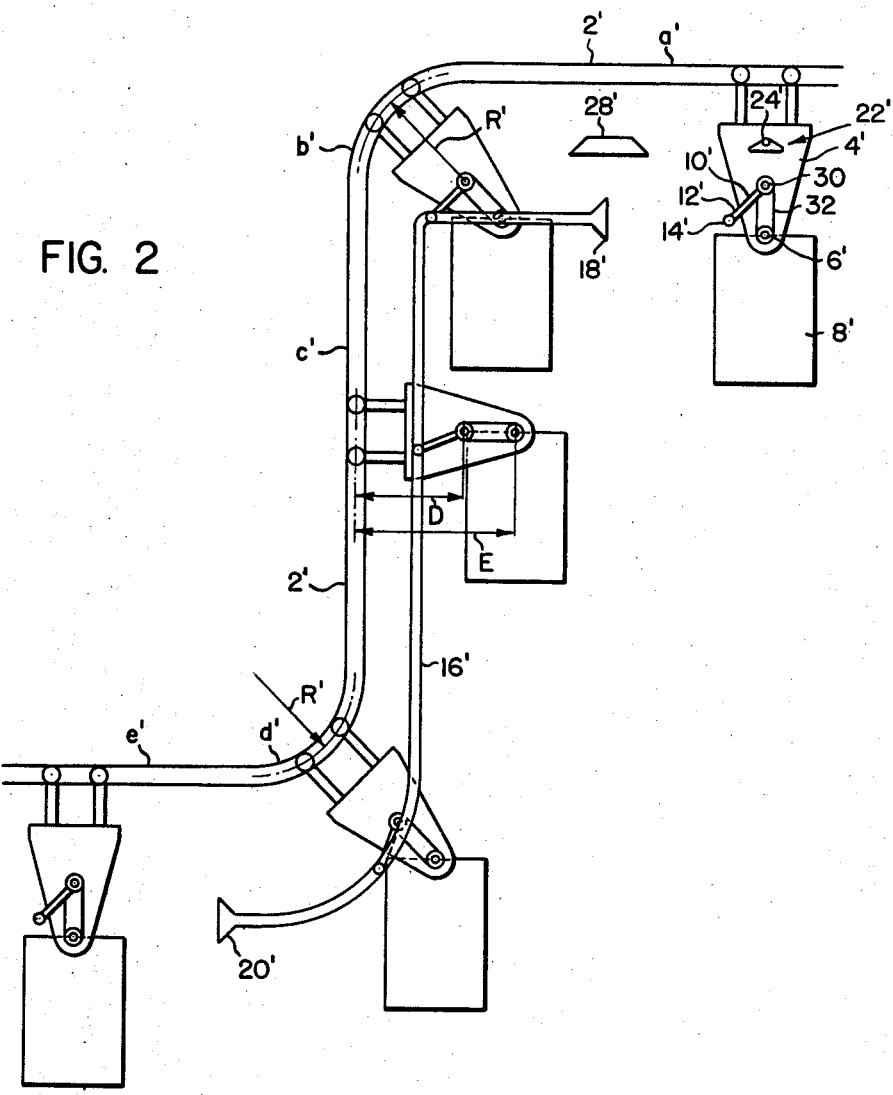

These and other objects, advantages and characterizing features of the invention will become more apparent upon consideration of the following detailed description thereof when taken in connection with the accompanying drawings depicting the same in which:

FIGURE 1 is a schematic view showing various positions of the container with respect to curvatures and inclinations of the monorail track section, where, according to one embodiment of the invention, the distance between the shaft from which the container is suspended and the adjacent monorail track section is shorter than the radius of curvature of the transitional track section; and FIGURE 2 is a schematic view similar to FIGURE 1 only showing another embodiment of the invention wherein the distance between the shaft from which the container is suspended and the adjacent monorail track section is greater than the radius of curvature of the transitional track section.

DESCRIPTION OF THE PREFERRED EMBODIMENTS

Referring now to the drawings, FIGURE 1 shows a section of monorail track 2 which comprises horizontal sections *a* and *e,* a vertical section *c* and transitional or curved sections *b* and *d.* A transporter 4 riding on the monorail track is adapted to travel along all sections of the track under its own power. Journaled to the transporter is a rocking shaft 6 from which is suspended a container 8. With this arrangement the container can swing freely under the influence of gravity, as long as neither the container nor the rocking shaft is held secured.

Rigidly fixed to one end of shaft 6 is a guide lever 10 which carries on its free end 12 a guide roller 14. Guide roller 14 is provided for engaging and running through a guide rail 16 whenever monorail track 2 deviates from a horizontal course. The guide rail can be any shape suitable for receiving and guiding roller 14 through a path of travel as, for example, a channel section. Guide rail 16 has its ends 18 and 20 flared so as to facilitate the engagement and reception of roller 14 into the guide rail.

In the embodiment as shown in FIGURE 1, the distance D between the axis of rocking shaft 6 and the adjacent monorail track section is smaller than the radius of curvature R of either transition monorail track sections *b* or *d*. This in turn facilitates the task of designing the appropriate shape of guide rail 16 to insure that the engagement of guide roller 14 and guide rail 16 will always maintain container 8 in the correct vertically oriented position regardless of the inclination of the adjacent monorail track section.

In the case of horizontal travel container 8 is locked in the correct vertically oriented position by a mechanical lock generally indicated at 22. Lock 22 includes a lock roller 24 mounted on transporter 4 and a detent 26 which is fixed to an extension (not shown) of container 8. During horizontal travel the presence of roller 24 in detent 26 locks the container in a vertical orientation. When moving from a horizontal to vertical mode of travel, a cam 28 provided adjacent the flanged entrance end 18 of guide rail 16 first engages and moves lock roller 24 from detent 26 just as guide roller 14 enters guide rail 16. Since detent 26 is fixed to an extension of the container, moving lock roller 24 from detent 26 frees the container and allows guide roller 14 to track guide rail 16. With guide roller tracking guide rail 16, the container will be maintained in the correct vertically oriented position as the transporter traverses the curved and vertical monorail track sections *b, d* and *c* respectively. In this respect, the journaling of shaft 6 to the transporter permits the transporter to swivel with respect to the container so that the container will remain vertically oriented regardless of the inclination of the transporter. Then, as the transporter passes from a transition or curved monorail track section, such as *d* onto a horizontal track section, such as *e,* the resilient mounting of lock roller 24 causes it to relocate in detent 26 so as to re-effect locking mechanism 22 just before guide roller 14 leaves guide rail 16.

In the embodiments shown in FIGURE 2, like structure will be indicated by the prime of like reference numerals. As shown in FIGURE 2, the axis of shaft 6' is spaced from an adjacent monorail track section a distance E which is greater than the radius of curvature R' of the transition or curved monorail track sections. Thus, another shaft 30 is journaled to transporter 4' and the guide lever 10' with its guide roller 14' is fixed to this shaft. Shaft 30 is spaced from the adjacent monorail track a distance D' which is not greater than the radius of curvature R' of the transitional or curved monorail track sections and is connected to shaft 6' by any suitable drive means, such as a chain and sprocket 32. With chain and sprocket interconnecting shafts 6' and 30 and with guide roller 14' tracking guide rail 16' it should be apparent that the vertical orientation of container 8' is determined by the rotation of shaft 30. Thus, the action of the stabilizing device as shown in FIGURE 2 is similar to that shown in FIGURE 1 since both rocking shafts 4 (FIGURE 1) and 30 (FIGURE 2) are spaced from the adjacent monorail track section a distance which is not greater than the radius of any transition or curved monorail track sections.

Thus, it will be appreciated that the present invention accomplishes its intended objects providing a stabilizing and locking mechanism for monorail transported containers which maintains the container in a vertically oriented position and prevents the container from swaying regardless of the inclination of the monorail track or the load distribution in the container. Since the rocking shafts 4 (FIGURE 1) and 30 (FIGURE 2) are always spaced from the adjacent monorail track section a distance which is not greater than the radius of curvature of any transition or curved monorail track sections, the design and installation of guide rails 2 and 2' is greatly facilitated. Moreover, the use of a locking device to maintain the container in a vertically adjusted position during horizontal courses of travel eliminates the need for guide rails throughout the entire system of monorail track.

While the preferred embodiments of the invention have been described, it will be readily apparent to one skilled in the art that various modifications can be made therein without changing the spirit and scope of the invention as set out in the appended claims.

Having thus described the invention in detail, what is claimed as new is:

1. In a transport system including horizontal and vertical rail sections connected by transitional or curved rail sections, a transporter traveling on the rail sections, and a container pivotally suspended from the transporter, an improvement comprising a stabilizing device for maintaining the container in a vertically oriented position as the transporter traverses the curved and vertical rail sections, said stabilizing device comprising:
- (a) a shaft journaled to said transporter and connected to said container, the axis of said shaft being spaced from an adjacent rail section a distance not greater than the radius of curvature of said curved rail sections;
- (b) a guide lever fixed to said shaft; and
- (c) a guide rail spaced from and co-extending with said curved and vertical rail sections, said guide rail adapted to engage and direct the course of travel of said guide lever to maintain said container in a vertically oriented position as said transporter traverses said curved and vertical rail sections.

2. The apparatus as set forth in claim 1 in which said container is fixed to said shaft.

3. The apparatus as set forth in claim 1 further comprising:
- (a) a second shaft journaled to said transporter and fixed to said container; and
- (b) drive means connecting said first and second shafts for rotating said first and second shafts in synchronism.

4. The apparatus as set forth in claim 1 in which a roller is carried on one end of said guide lever for engaging said guide rail.

5. The apparatus as set forth in claim 1 in which the ends of said guide rail are flared to facilitate engagement with said guide lever.

References Cited

UNITED STATES PATENTS 3,298,536   1/1967   Zippel _____ 198—137 X

EDWARD A. SROKA, Primary Examiner

U.S. Cl. X. R.

198—137, 177